United States Patent
Cheng (10) Patent No.: US 11,085,609 B1
(45) Date of Patent: Aug. 10, 2021

(54) ILLUMINATION DEVICE (71) Applicant: HIMAX TECHNOLOGIES LIMITED, Tainan (TW)

(72) Inventor: Yu-Ching Cheng, Tainan (TW)

(73) Assignee: HIMAX TECHNOLOGIES LIMITED, Tainan (TW)

( * ) Notice: Subject to any disclaimer, the term of this patent is extended or adjusted under 35 U.S.C. 154(b) by 0 days.

(21) Appl. No.: 17/170,792

(22) Filed: Feb. 8, 2021

(51) Int. Cl.
F21V 5/00 (2018.01)
F21Y 105/10 (2016.01)

(52) U.S. Cl.
CPC .............. *F21V 5/007* (2013.01); *F21V 5/004* (2013.01); *F21Y 2105/10* (2016.08)

(58) Field of Classification Search
CPC . F21V 5/007; F21V 5/10; F21V 5/004; H01L 27/14627; G02B 3/0006; G02B 3/0056; G02B 19/0057; G02B 19/0066; G01S 17/00; G01S 17/89

See application file for complete search history.

(56) References Cited

U.S. PATENT DOCUMENTS

| | | | | |
|---|---|---|---|---|
| 9,273,846 | B1* | 3/2016 | Rossi | F21V 5/007 |
| 9,851,571 | B1* | 12/2017 | Zhang | G02B 27/0927 |
| 10,768,343 | B2* | 9/2020 | Boytard | G02B 27/0961 |
| 2012/0257191 | A1* | 10/2012 | Deckenbach | G07D 7/1205 356/71 |
| 2018/0267214 | A1* | 9/2018 | Rossi | G02B 3/0056 |

* cited by examiner

*Primary Examiner* — Rajarshi Chakraborty
*Assistant Examiner* — Michael Chiang
(74) *Attorney, Agent, or Firm* — JCIPRNET (57) ABSTRACT

An illumination device including a light source array and a microlens array is provided. The light source array includes a plurality of light sources arranged in an array. The microlens array includes a plurality of microlenses arranged in an array. The illumination device satisfies the following conditional expressions so as to produce structured light: $z=z0+dz$ and $z0=(m/2)*(P^2/\lambda)$, where z is a distance between the light source array and the microlens array along a central axis of the microlens array, P is a lens pitch of the microlens array, $\lambda$ is a wavelength of the light sources, m is an integer and m' is a non-integer number. The illumination device satisfies $1\% \leq dz/z0 \leq 5\%$ or $-5\% \leq dz/z0 \leq -1\%$.

20 Claims, 7 Drawing Sheets

ILLUMINATION DEVICE

BACKGROUND

Technical Field

The invention generally relates to an optical device and, in particular, to an illumination device.

Description of Related Art

In 3D sensing, to determine the depth of an object, the illumination devices that project dot patterns or/and diffused light patterns (flood patterns) are usually needed. In some applications that use time-of flight for 3D sensing, to enhance the depth accuracy, both the dot and the flood patterns are required.

For dot pattern, the principle of the illumination device for 3D sensing is usually to produce a specific light pattern by using the interference of the light passing through the light-shape generating element. The light-shape generating element, for example, is grating or microlens array. However, due to the optical aberration of the lens element itself, the quality of the light pattern produced by the illumination device is usually poorer when the light-shape generating element is microlens array. On the other hand, for flood pattern, the interference of the light may cause stripe issue.

SUMMARY

Accordingly, the invention is directed to an illumination device, the structure of which facilitates producing light pattern with higher quality.

According to an embodiment of the invention, an illumination device including a light source array and a microlens array is provided. The light source array includes a plurality of light sources arranged in an array. The microlens array includes a plurality of microlenses arranged in an array. The illumination device satisfies the following conditional expressions so as to produce structured light: $z=z0+dz$ and $z0=(m/2)*(P^2/\lambda)$, where z is a distance between the light source array and the microlens array along a central axis of the microlens array, P is a lens pitch of the microlens array, $\lambda$ is a wavelength of the light sources, m is an integer and m' is a non-integer number. The illumination device satisfies $1\% \leq dz/z0 \leq 5\%$ or $-5\% \leq dz/z0 \leq -1\%$.

According to an embodiment of the invention, an illumination device including a light source array and a microlens array is provided. The light source array includes a plurality of light sources arranged in an array. The microlens array includes a plurality of microlenses arranged in an array. The illumination device satisfies the following conditional expressions so as to produce flood light: $z=z0+dz$ and $z0=(m/2)*(P^2/\lambda)$, where z is a distance between the light source array and the microlens array along a central axis of the microlens array, P is a lens pitch of the microlens array, $\lambda$ is a wavelength of the light sources, m is an integer and m' is a non-integer number. The illumination device satisfies $5\% < dz/z0 \leq 20\%$ or $-20\% \leq dz/z0 < -5\%$.

According to an embodiment of the invention, an illumination device including a first sub-illumination device and a second sub-illumination device configured to produce flood light is provided. The first sub-illumination device includes a first light source array and a first microlens array. The first light source array includes a plurality of first light sources arranged in an array. The first microlens array includes a plurality of first microlenses arranged in an array. The first sub-illumination device satisfies the following conditional expressions so as to produce structured light: $z1=z0+dz$ and $z0=(m/2)*(P11^2/\lambda 1)$, where z1 is a distance between the first light source array and the first microlens array along a central axis of the first microlens array, P11 is a lens pitch of the first microlens array, $\lambda 1$ is a wavelength of the first light sources, m is an integer and m' is a non-integer number. The first sub-illumination device satisfies $1\% \leq dz/z0 \leq 5\%$ or $-5\% \leq dz/z0 \leq -1\%$. The second sub-illumination device includes a second light source array and a second microlens array. The second light source array includes a plurality of second light sources arranged in an array. The second microlens array includes a plurality of second microlenses arranged in an array.

Based on the above, because the illumination device in an embodiments of the disclosure satisfies the conditional expressions of $z=z0+dz$ and $z0=(m/2)*(P^2/\lambda)$ and the illumination device further satisfies $1\% \leq dz/z0 \leq 5\%$ or $-5\% \leq dz/z0 \leq -1\%$, when the optimal dz is chosen, the illumination device could produce structured light pattern with higher quality.

Furthermore, because the illumination device in an embodiments of the disclosure satisfies the conditional expressions of $z=z0+dz$ and $z0=(m/2)*(P^2/\lambda)$ and the illumination device further satisfies $5\% < dz/z0 \leq 20\%$ or $-20\% \leq dz/z0 < -5\%$, when the optimal dz is chosen, the illumination device could produce flood light pattern with higher quality.

Moreover, because the illumination device in the embodiments of the disclosure includes first sub-illumination device and second sub-illumination device, the first sub-illumination device satisfies the conditional expressions of $z1=z0+dz$ and $z0=(m/2)*(P11^2/\lambda 1)$, and the first sub-illumination device further satisfies $1\% \leq dz/z0 \leq 5\%$ or $-5\% \leq dz/z0 \leq -1\%$, when the optimal dz is chosen, the illumination device could both produce structured light pattern with higher quality and produce flood light with higher quality.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
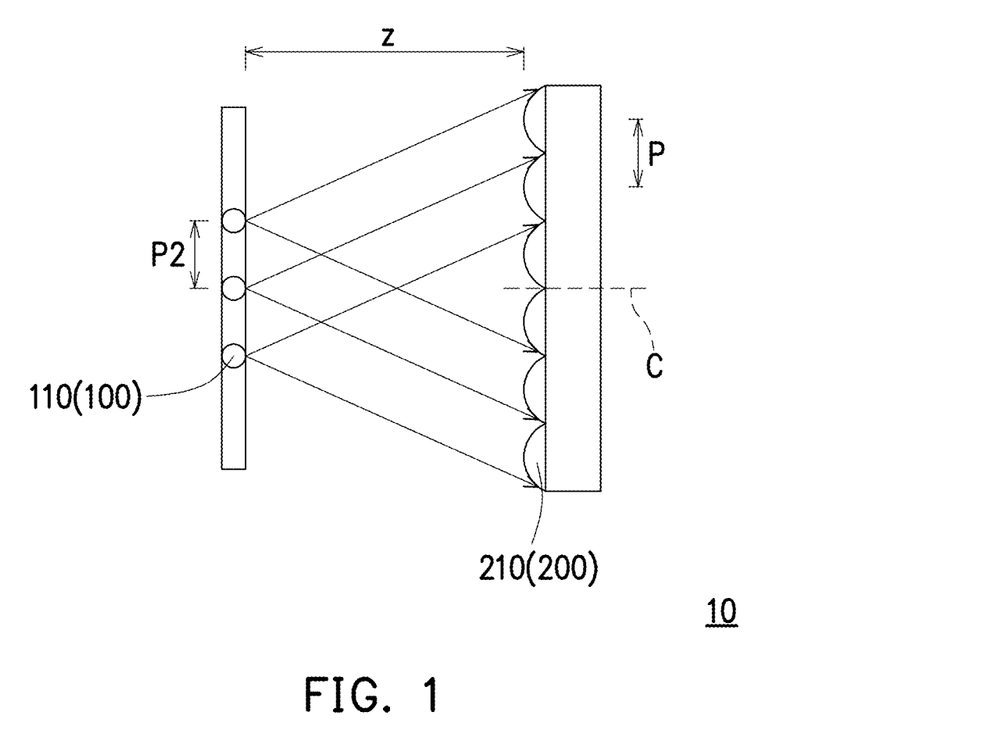
FIG. 1 is a schematic cross-sectional view of an illumination device according to a first embodiment of the invention.

FIG. 1 is a schematic cross-sectional view of an illumination device according to a first embodiment of the invention. Referring to FIG. 1, an illumination device 10 in this embodiment includes a light source array 100 and a microlens array 200. The light source array 100 includes a plurality of light sources 110 arranged in an array. In this embodiment, the light source 110 is laser sources. For example, the light source 110 is a vertical cavity surface emitting laser (VCSEL). However, in other embodiment, the light source array 100 may be a laser diode array, and the light sources 110 are laser diodes, respectively.

In this embodiment, the microlens array 200 includes a plurality of microlenses 210 arranged in an array. The illumination device 10 satisfies the following conditional expressions so as to produce structured light: $z=z0+dz=(m'/2)*(P^2/\lambda)$ and $z0=(m/2)*(P^2/\lambda)$, where z is a distance between the light source array 100 and the microlens array 200 along a central axis C of the microlens array, P is a lens pitch of the microlens array 200, $\lambda$ is a wavelength of the light sources 110, m is an integer and m' is a non-integer number. The illumination device 10 also satisfies $1\% \leq dz/z0 \leq 5\%$ (or $1.01 \leq m'/m \leq 1.05$) or $-5\% \leq dz/z0 \leq -1\%$ (or $0.95 \leq m'/m \leq 0.99$).

In this embodiment, the illumination device 10 has regular lens pitch and regular light-source pitch. That is, the lens pitch P between any two adjacent microlens is the same, and the light-source pitch P2 between any two adjacent light sources is also the same.

In this embodiment, the illumination device 10 satisfies K*P2=N*P, where K is an integer and N is an integer.

TABLE 1

| lens pitch P (μm) | m | z0 (mm) | dz (μm) | z (mm) | # of dots in 67 × 53 (degree²) |
|---|---|---|---|---|---|
| 37.2 | 2 | 1.472 | 40 | 1.512 | 5145 |
| 37.2 | 3 | 2.208 | 50 | 2.258 | 3822 |
| 37.6 | 3 | 2.256 | 30 | 2.286 | 3878 |
| 38 | 2 | 1.536 | 30 | 1.566 | 5328 |
| 38 | 3 | 2.304 | 30 | 2.334 | 3948 |

Figure 2:
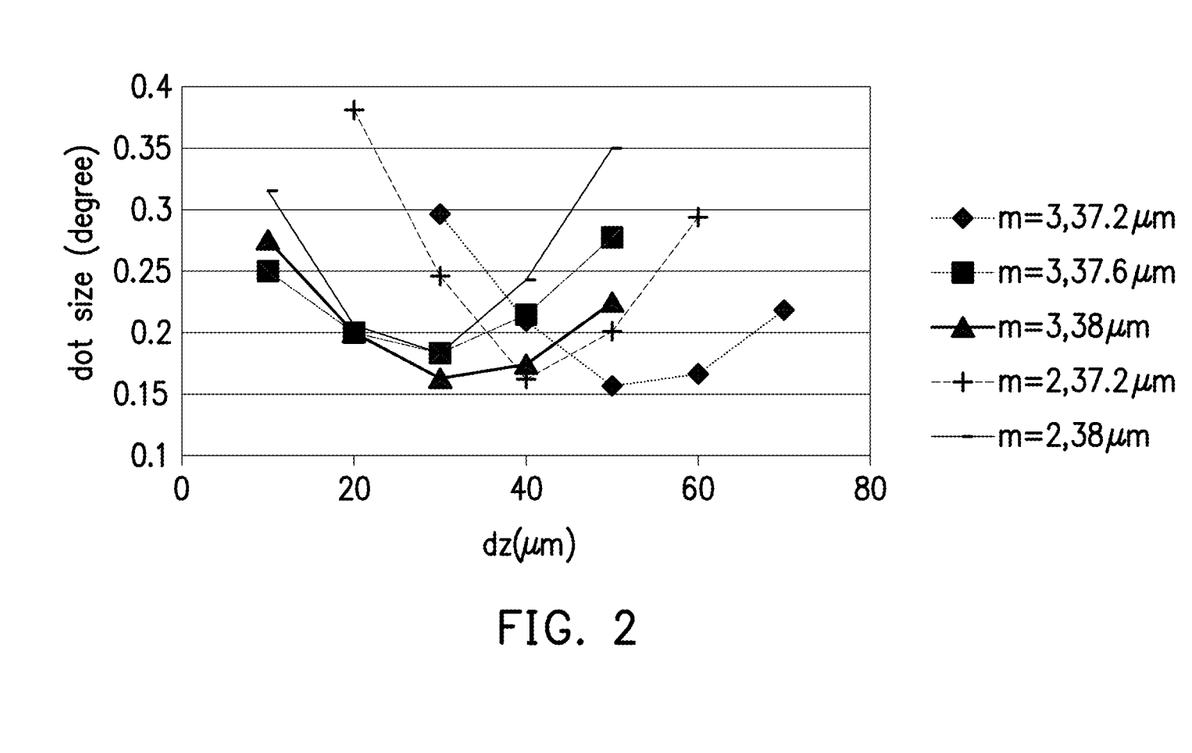
FIG. 2 is a broken line graph of average dot size vs. dz of the illumination device according to the embodiments of FIG. 1.
Figure 3:
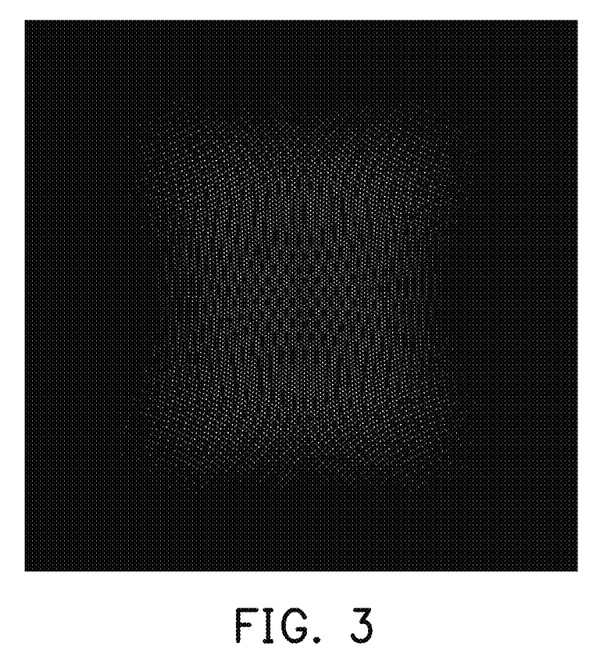
FIG. 3 is an example of a structured-light pattern produced by the illumination device in FIG. 1.

FIG. 2 is a broken line graph of average dot size vs. dz of the illumination device according to the embodiments of FIG. 1. Table 1 shows the conditions of the best (smallest) average dot size of structured-light pattern in different lens pitch of the illumination device according FIG. 2. FIG. 3 is an example of a structured-light pattern produced by the illumination device in FIG. 1. In FIG. 2, FIG. 3 and Table 1, $\lambda$ is 940 nm. In FIG. 3, P=P2=37.6 μm, m=3, dz=30 μm, and the screen size is 940×940 mm². Referring to FIG. 2, FIG. 3 and Table 1, the structured-light pattern produced by the illumination device 10 has higher quality.

Figure 4:
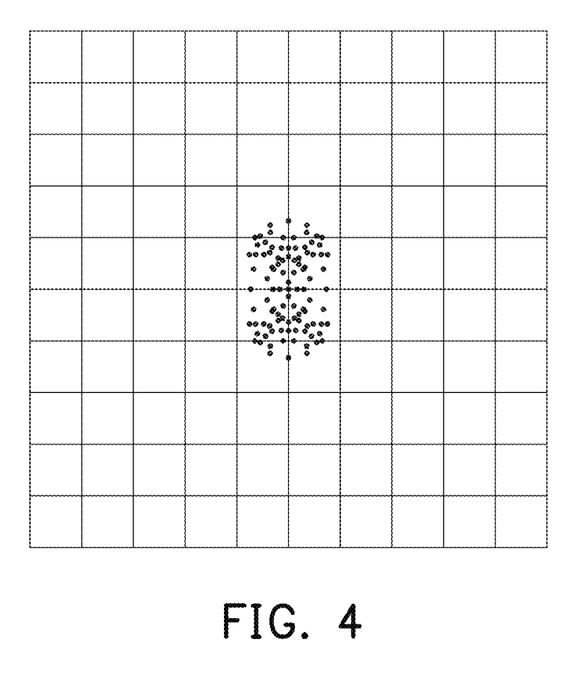
FIG. 4 is an example of a simulated spot diagram produced by one of the microlenses of the illumination device in FIG. 1 when the microlens is convex lens.
Figure 5:
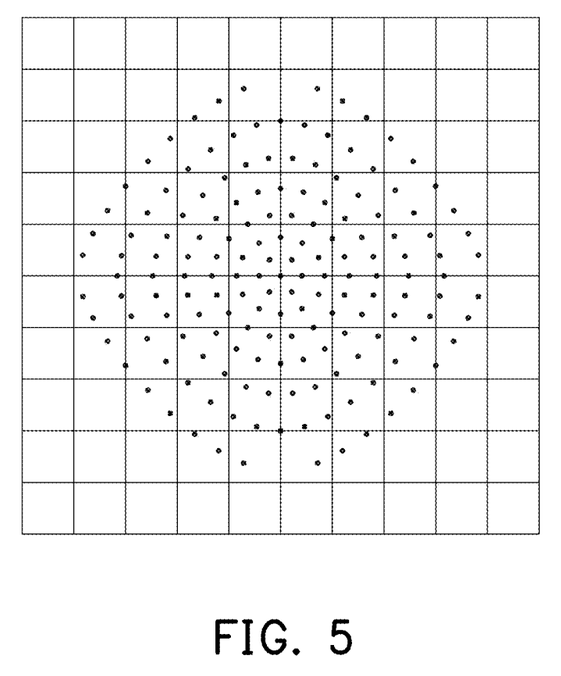
FIG. 5 is an example of a simulated spot diagram produced by one of the microlenses of the illumination device in FIG. 1 when the microlens is concave lens.

FIG. 4 is an example of a simulated spot diagram produced by one of the microlenses of the illumination device in FIG. 1 when the microlens is convex lens. FIG. 5 is an example of a simulated spot diagram produced by one of the microlenses of the illumination device in FIG. 1 when the microlens is concave lens. The simulated software in FIGS. 4 and 5 could be such as Zemax. Moreover, the screen size is 40×40 mm². In FIG. 4, P=P2=37.2 μm, m=3, z0=2.208 mm, dz=50 μm, z=2.258 mm, 3611 of dots in 51×65 degree², the maximum dot size is 0.293 degree and the average dot size is 0.156 degree. However, in FIG. 4, the maximum dot size is 0.816 degree and the average dot size is 0.526 degree when z=z0 (i.e., dz=0). In FIG. 5, P=P2=37.2 μm, m=3, z0=2.208 mm, dz=0 μm, z=2.208 mm, 3445 of dots in 51×65 degree², the maximum dot size is 0.307 degree and the average dot size is 0.192 degree. Furthermore, a range of distribution of dots in FIG. 5 is larger than a range of distribution of dots in FIG. 4, which implies an optical aberration in FIG. 5 is larger than an optical aberration in FIG. 4. Referring to FIGS. 4 and 5, in an embodiment, the microlenses 210 may be convex lenses or concave lenses, wherein the illumination device 10 has better performance when the microlenses 210 are adopted as convex lenses. Moreover, when the microlenses 210 are adopted as convex lenses and the optimal dz is chosen, both the maximum dot size and the average dot size are smaller than dz=0.

Based on the foregoing, because the illumination device 10 in the embodiments of the disclosure satisfies the conditional expressions of $z=z0+dz$ and $z0=(m/2)*(P^2/\lambda)$ and the illumination device 10 further satisfies $1\% \leq dz/z0 \leq 5\%$ or $-5\% \leq dz/z0 \leq -1\%$, when the optimal dz is chosen, the illumination device 10 could produce structured light pattern with higher quality. That is, the optimal dz is chosen to compensate the optical aberration of the microlenses 200 due to the non-ideal optical element, the illumination device 10 therefore could produce structured light pattern with higher quality.

Furthermore, the illumination device 10 could also produce flood light. The illumination device 10 producing flood light is similar to the illumination device 10 producing structured light, and thus the descriptions of the same parts are omitted herein. Main differences between the illumination device 10 producing flood light and the illumination device 10 producing structured light are as below. Referring to FIG. 1 again, in this embodiment, the illumination device 10 satisfies $5\% < dz/z0 \leq 20\%$ or $-20\% \leq dz/z0 < -5\%$.

In this embodiment, the illumination device 10 has regular lens pitch and satisfies P2≠N*P, where N is an integer. In another embodiment, the illumination device 10 has random light-source pitch.

In this embodiment, wavelengths $\lambda$ of the light sources 110 are the same. In another embodiment, the light sources 110 of the illumination device 10 could have a plurality of different wavelengths $\lambda$. When the illumination device 10 is designed to have different wavelengths $\lambda$, stripe of the flood pattern provided by the illumination device 10 would be less obvious and thus the flood pattern would be smoother.

Figure 6:
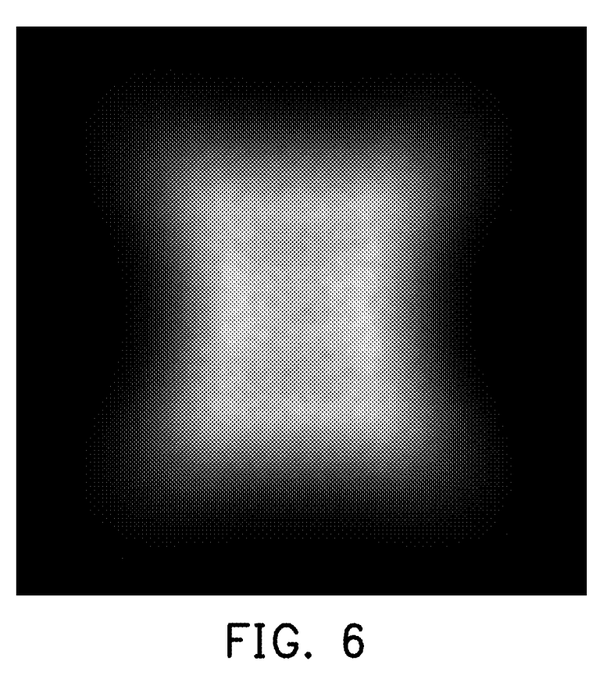
FIG. 6 is an example of a flood-light pattern produced by the illumination device in FIG. 1.

FIG. 6 is an example of a flood-light pattern produced by the illumination device in FIG. 1. In FIG. 6, P=40 μm, P2 are random values, m=3, z0=2.553 mm, dz=−300 μm, z=2.253 mm and the screen size is 940×940 mm². Referring to FIG. 6, based on the foregoing, because the illumination device 10 in the embodiments of the disclosure satisfies the conditional expressions of $z=z0+dz$ and $z0=(m/2)*(P^2/\lambda)$ and the illumination device 10 further satisfies $5\% < dz/z0 \leq 20\%$ or $-20\% \leq dz/z0 < -5\%$, when the optimal dz is chosen, the illumination device 10 could produce flood light pattern with higher quality.

Figure 7:
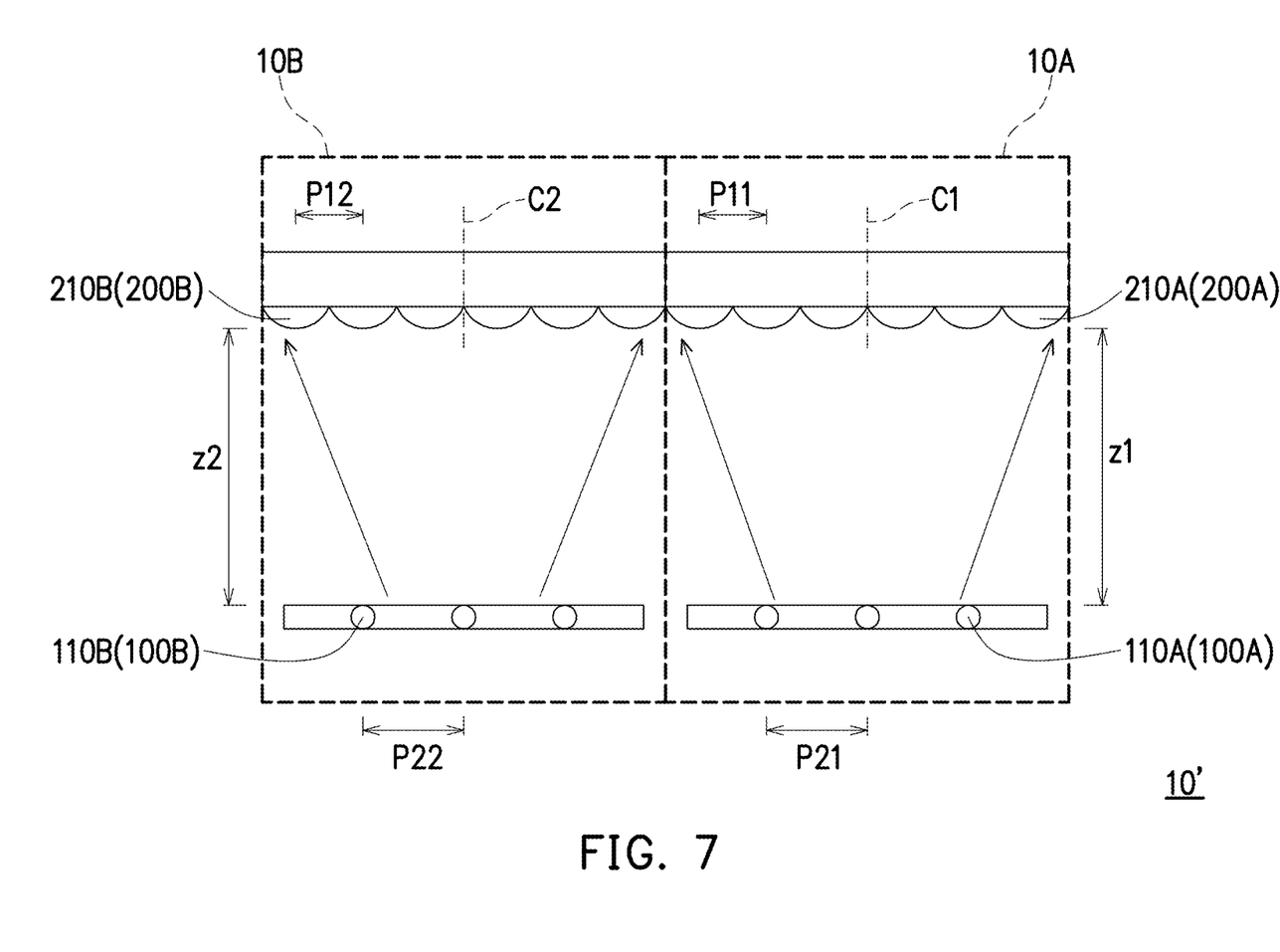
FIG. 7 is a schematic cross-sectional view of an illumination device according to a second embodiment of the invention.

FIG. 7 is a schematic cross-sectional view of an illumination device according to a second embodiment of the invention. Referring to FIG. 7, the illumination device 10' of this embodiment is similar to the illumination device 10 of FIG. 1, and the main difference therebetween is that the illumination device 10' includes a first sub-illumination device 10A and a second sub-illumination device 10B configured to produce flood light. The first sub-illumination device 10A is similar to the illumination device 10 producing structured light, and includes a first light source array 100A and a first microlens array 200A. The details of the first light source array 100A, the first light sources 110A, the first microlens array 200A and the first microlenses 210A and the relationship between each other have been described in abovementioned embodiment, and will not be repeated here. Furthermore, the first sub-illumination device 10A satisfies the following conditional expressions so as to produce structured light: $z1=z0+dz=(m'/2)*(P11^2/\lambda)$ and $z0=(m/2)*(P11^2/\lambda1)$, where z1 is a distance between the first light source array 100A and the first microlens array 200A along a central axis C1 of the first microlens array 200A, P11 is a lens pitch of the first microlens array 200A, $\lambda1$ is a wavelength of the first light sources 110A, m is an integer and m' is a non-integer number. The first sub-illumination device 10A also satisfies $1\% \leq dz/z0 \leq 5\%$ (or $1.01 \leq m'/m \leq 1.05$) or $-5\% \leq dz/z0 \leq -1\%$ (or $0.95 \leq m'/m \leq 0.99$).

In this embodiment, the second sub-illumination device 10B is similar to the illumination device 10 producing flood light, and includes a second light source array 100B and a second microlens array 200B. The details of the second light source array 100B, the second light sources 110B, the second microlens array 200B and the second microlenses 210B and the relationship between each other have been described in abovementioned embodiment, and will not be repeated here.

In this embodiment, the first sub-illumination device 10A has regular lens pitch and regular light-source pitch. Moreover, the first sub-illumination device 10A satisfies $K*P21=N*P11$, where P21 is a light-source pitch of the first light source array 100A, K is an integer and N is an integer.

In this embodiment, the first light source array 100A and the second light source array 100B are coplanar. The first microlens array 200A and the second microlens array 200B are also coplanar. That is, the illumination device 10' satisfies $z1=z2$, where z2 is a distance between the second light source array 100B and the second microlens array 200B along a central axis C2 of the second microlens array 200B.

In this embodiment, the second sub-illumination device 10B has regular lens pitch and satisfies $P11=P12$, where P12 is a lens pitch of the second microlens array 200B. Moreover, the second sub-illumination device 10B has random light source pitch, or has regular light source pitch satisfies $P22 \neq N*P12$, where P22 is a light-source pitch of the second light source array 100B and N is an integer. In an embodiment, $\lambda1=\lambda2$, where $\lambda2$ is a wavelength of the second light sources 110B. However, the disclosure is not limited thereof. In another embodiment, $\lambda1 \neq \lambda2$.

In a similar embodiment, the second sub-illumination device 10B has random lens pitch, and satisfies $P12 \neq P11$, where P12 is a lens pitch of the second microlens array 200B. Moreover, the second sub-illumination device 10B has random light-source pitch. However, the disclosure is not limited thereof. In another embodiment, the second sub-illumination device 10B has regular light-source pitch.

Based on the foregoing, because the illumination device 10' in the embodiments of the disclosure includes first sub-illumination device 10A and second sub-illumination device 10B configured to produce flood light, the first sub-illumination device 10A satisfies the conditional expressions of $z1=z0+dz$ and $z0=(m/2)*(P11^2/\lambda1)$, and the first sub-illumination device 10A further satisfies $1\% \leq dz/z0 \leq 5\%$ or $-5\% \leq dz/z0 \leq -1\%$, when the optimal dz is chosen, the illumination device 10' could both produce structured light pattern with higher quality and produce flood light with higher quality. Since both the first light source array 100A and the second light source array 100B are on the same plane and both the first microlens array 200A and the second microlens array 200B are also on the same plane, the illumination device 10' is easier for assembly.

Figure 8:
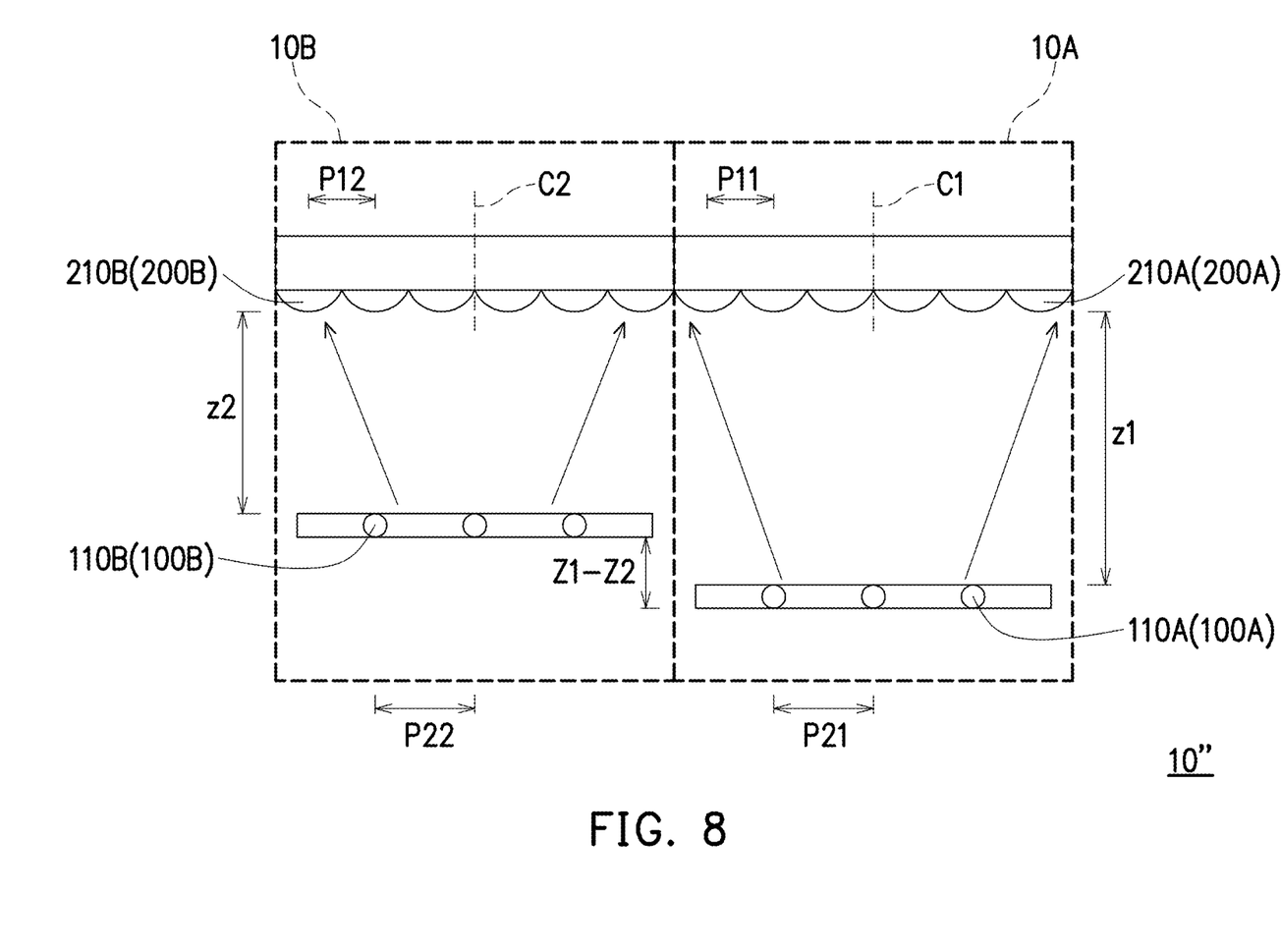
FIG. 8 is a schematic cross-sectional view of an illumination device according to a third embodiment of the invention.

FIG. 8 is a schematic cross-sectional view of an illumination device according to a third embodiment of the invention. Referring to FIG. 8, the illumination device 10" of this embodiment is similar to the illumination device 10' of FIG. 7, and the main difference therebetween is that, in the illumination device 10", the first microlens array 200A and the second microlens array 200B are coplanar, and the second sub-illumination device 10B satisfies $5\% < (z1-z2)/z1 \leq 20\%$ or $-20\% \leq (z1-z2)/z1 < -5\%$. That is, the first light source array 100A and the second light source array 100B are not coplanar.

In this embodiment, the second sub-illumination device 10B has regular lens pitch and satisfies $P11=P12$. Moreover, the second sub-illumination device 10B has random light source pitch, or has regular light source pitch satisfies $P22 \neq N*P12$. Since P11 and P12 are the same, only a single microlens-array design is needed. When the optimal z1-z2 is chosen, stripe of the flood pattern provided by the illumination device 10" would be less obvious and thus the flood pattern would be smoother.

Figure 9:
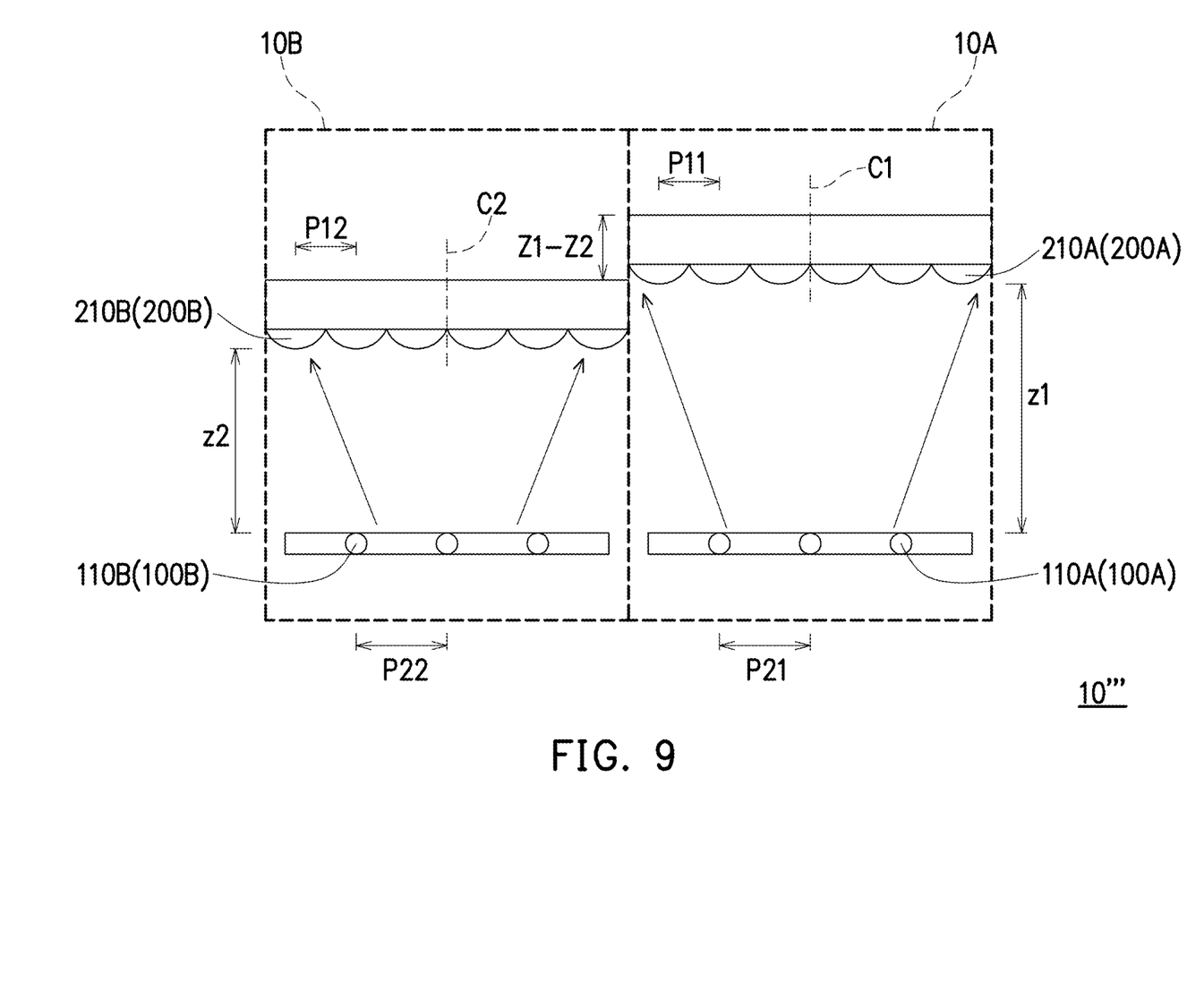
FIG. 9 is a schematic cross-sectional view of an illumination device according to a fourth embodiment of the invention.

FIG. 9 is a schematic cross-sectional view of an illumination device according to a fourth embodiment of the invention. Referring to FIG. 9, the illumination device 10''' of this embodiment is similar to the illumination device 10" of FIG. 8, and the main difference therebetween is that, in the illumination device 10''', the first light source array 100A and the second light source array 100B are coplanar, and the second sub-illumination device 10B satisfies $5\% < (z1-z2)/z1 \leq 20\%$ or $-20\% \leq (z1-z2)/z1 < -5\%$. That is, the first microlens array 200A and the second microlens array 200B are not coplanar. The advantage of the illumination device 10''' is similar to the advantage of the illumination device 10", and will not be repeated here.

Based on the foregoing, because the illumination device in an embodiments of the disclosure satisfies the conditional expressions of $z=z0+dz$ and $z0=(m/2)*(P^2/\lambda)$ and the illumination device further satisfies $1\% \leq dz/z0 \leq 5\%$ or $-5\% \leq dz/z0 \leq -1\%$, when the optimal dz is chosen, the illumination device could produce structured light pattern with higher quality.

Furthermore, because the illumination device in an embodiments of the disclosure satisfies the conditional expressions of $z=z0+dz$ and $z0=(m/2)*(P^2/\lambda)$ and the illumination device further satisfies $5\% < dz/z0 \leq 20\%$ or $-20\% \leq dz/z0 < -5\%$, when the optimal dz is chosen, the illumination device could produce flood light pattern with higher quality.

Moreover, because the illumination device in the embodiments of the disclosure includes first sub-illumination device and second sub-illumination device, the first sub-illumination device satisfies the conditional expressions of $z1=z0+dz$ and $z0=(m/2)*(P11^2/\lambda1)$, and the first sub-illumination device further satisfies $1\% \leq dz/z0 \leq 5\%$ or $-5\% \leq dz/z0 \leq -1\%$, when the optimal dz is chosen, the illumination device could both produce structured light pattern with higher quality and produce flood light with higher quality.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An illumination device, comprising:
   a light source array comprising a plurality of light sources arranged in an array; and
   a microlens array comprising a plurality of microlenses arranged in an array,
   wherein the illumination device satisfies the following conditional expressions so as to produce structured light: $z=z0+dz$ and $z0=(m/2)*(P^2/\lambda)$, where z is a distance between the light source array and the microlens array along a central axis of the microlens array, P is a lens pitch of the microlens array, $\lambda$ is a wavelength of the light sources, m is an integer and m' is a non-integer number,
   wherein the illumination device satisfies $1\% \leq dz/z0 \leq 5\%$ or $-5\% \leq dz/z0 \leq -1\%$.

2. The illumination device according to claim 1, wherein the illumination device has regular lens pitch and regular light-source pitch.

3. The illumination device according to claim 1, wherein the illumination device satisfies $K*P2=N*P$, where P2 is a light-source pitch of the light source array, K is an integer and N is an integer.

4. The illumination device according to claim 1, wherein the microlenses are convex lenses or concave lenses.

5. An illumination device, comprising:
   a light source array comprising a plurality of light sources arranged in an array; and
   a microlens array comprising a plurality of microlenses arranged in an array,
   wherein the illumination device satisfies the following conditional expressions so as to produce flood light: $z=z0+dz$ and $z0=(m/2)*(P^2/\lambda)$, where z is a distance between the light source array and the microlens array along a central axis of the microlens array, P is a lens pitch of the microlens array, $\lambda$ is a wavelength of the light sources, m is an integer and m' is a non-integer number,
   wherein the illumination device satisfies $5\% < dz/z0 \leq 20\%$ or $-20\% \leq dz/z0 < -5\%$.

6. The illumination device according to claim 5, wherein the illumination device has regular lens pitch and satisfies $P2 \neq N*P$, where P2 is a light-source pitch of the light source array and N is an integer.

7. The illumination device according to claim 5, wherein the illumination device has random light-source pitch.

8. The illumination device according to claim 5, wherein the microlenses are convex lenses or concave lenses.

9. An illumination device, comprising:
   a first sub-illumination device, comprising:
      a first light source array comprising a plurality of first light sources arranged in an array; and
      a first microlens array comprising a plurality of first microlenses arranged in an array,
      wherein the first sub-illumination device satisfies the following conditional expressions so as to produce structured light: $z1=z0+dz$ and $z0=(m/2)*(P11^2/\lambda1)$, where z1 is a distance between the first light source array and the first microlens array along a central axis of the first microlens array, P11 is a lens pitch of the first microlens array, $\lambda1$ is a wavelength of the first light sources, m is an integer and m' is a non-integer number,
      wherein the first sub-illumination device satisfies $1\% \leq dz/z0 \leq 5\%$ or $-5\% \leq dz/z0 \leq -1\%$; and
   a second sub-illumination device configured to produce flood light, comprising:
      a second light source array comprising a plurality of second light sources arranged in an array; and
      a second microlens array comprising a plurality of second microlenses arranged in an array.

10. The illumination device according to claim 9, wherein the first sub-illumination device has regular lens pitch and regular light-source pitch, and the first sub-illumination device satisfies $K*P21=N*P11$, where P21 is a light-source pitch of the first light source array, K is an integer and N is an integer.

11. The illumination device according to claim 9, wherein the first light source array and the second light source array are coplanar, the first microlens array and the second microlens array are coplanar, and the illumination device satisfies $z1=z2$, where z2 is a distance between the second light source array and the second microlens array along a central axis of the second microlens array.

12. The illumination device according to claim 11, wherein
   the second sub-illumination device has regular lens pitch and satisfies $P11=P12$, where P12 is a lens pitch of the second microlens array;
   the second sub-illumination device has random light source pitch, or has regular light source pitch satisfies $P22 \neq N*P12$, where P22 is a light-source pitch of the second light source array and N is an integer.

13. The illumination device according to claim 12, wherein $\lambda1=\lambda2$, where $\lambda2$ is a wavelength of the second light sources.

14. The illumination device according to claim 12, wherein $\lambda1 \neq \lambda2$, where $\lambda2$ is a wavelength of the second light sources.

15. The illumination device according to claim 11, wherein
   the second sub-illumination device has random lens pitch, and satisfies $P12 \neq P11$, where P12 is a lens pitch of the second microlens array.

16. The illumination device according to claim 15, wherein the second sub-illumination device has random light-source pitch.

17. The illumination device according to claim 15, wherein the second sub-illumination device has regular light-source pitch.

18. The illumination device according to claim 9, wherein
   the second sub-illumination device has regular lens pitch and satisfies $P11=P12$, where P12 is a lens pitch of the second microlens array;
   the second sub-illumination device has random light source pitch, or has regular light source pitch satisfies $P22 \neq N*P12$, where P22 is a light-source pitch of the second light source array and N is an integer.

19. The illumination device according to claim 18, wherein the first microlens array and the second microlens array are coplanar, and the second sub-illumination device satisfies $5\% < (z1-z2)/z1 \leq 20\%$ or $-20\% \leq (z1-z2)/z1 < -5\%$, where $z2$ is a distance between the second light source array and the second microlens array along a central axis of the second microlens array.

20. The illumination device according to claim 18, wherein the first light source array and the second light source array are coplanar, and the second sub-illumination device satisfies $5\% < (z1-z2)/z1 \leq 20\%$ or $-20\% \leq (z1-z2)/z1 < -5\%$, where $z2$ is a distance between the second light source array and the second microlens array along a central axis of the second microlens array.

* * * * *